United States Patent [19]

Strong

[11] Patent Number: 4,815,417

[45] Date of Patent: * Mar. 28, 1989

[54] BROODER FEEDING APPARATUS

[76] Inventor: George W. Strong, Rte. 3, Box 1330, Center, Tex. 75935

[*] Notice: The portion of the term of this patent subsequent to Feb. 2, 2005 has been disclaimed.

[21] Appl. No.: 111,055

[22] Filed: Oct. 22, 1987

Related U.S. Application Data

[63] Continuation-in-part of Ser. No. 861,141, May 8, 1986, Pat. No. 4,722,301.

[51] Int. Cl.⁴ ............................................. A01K 5/00
[52] U.S. Cl. .............................. 119/52 AF; 119/51.12
[58] Field of Search ............. 119/51 R, 52 AF, 52 A, 119/53, 51.11, 18, 56 R, 51.12

[56] References Cited

U.S. PATENT DOCUMENTS

3,971,340  7/1976  Allen ............................. 119/52 AF
4,722,301  2/1988  Strong ........................... 119/52 AF

Primary Examiner—David A. Scherbel
Assistant Examiner—Creighton Smith
Attorney, Agent, or Firm—John M. Harrison

[57] ABSTRACT

An improved brooder feeding apparatus for a poultry house which includes at least one feed distribution apparatus suspended in a designated brooder area inside the poultry house for locating feed along the entire length of the brooder area, with specially designed, valve-operated drop tubes in the feed distribution apparatus and brooder feed pans located beneath the drop tubes, for distributing feed through the drop tubes into the pans and feeding brooder poultry such as baby chicks. The feed distribution apparatus is further characterized by an elongated, hollow tube provided with an auger and a feed hopper located at one end of the tube for moving feed from the feed hopper through the elongated tube and the drop tubes to a feed flow control box located at the opposite end of the feed tube. Feed distribution through the brooder feeding apparatus is controlled by valving the openings in the drop tubes and by means of a timer, an air cylinder and a microswitch provided in electrical connection with a drive motor which powers the auger. A method of feeding baby chicks in a poultry house which includes the steps of providing a specific brooder area in the poultry house.

30 Claims, 3 Drawing Sheets

BROODER FEEDING APPARATUS

BACKGROUND OF THE INVENTION

CROSS-REFERENCE TO RELATED APPLICATIONS

This application is a Continuation-In-Part of my co-pending U.S. patent application Ser. No. 06/861,141, filed May 8, 1986, entitled "Brooder Feeding Apparatus".

FIELD OF THE INVENTION

This invention relates to brooder houses and feeding apparatus for raising poultry and more particularly, to an improved method for feeding baby chicks in a specific brooder area using a brooder feeding apparatus which is characterized by an elongated tube provided with an internal auger, a feed hopper provided at one end of the tube and a control box located at the opposite end thereof, with spaced, valve-equipped drop tubes extending downwardly from the tube or trough and brooder pans located beneath the drop tubes. Feed is carried by the auger from the feed hopper through the tube and is delivered into and accumulated in the drop tubes and finally delivered to the brooder feed pans, through openings located in the tube. The drop tubes are fitted with automatically controlled feed control valves and are sequentially provided with feed for filling, beginning with the drop tube closest to the feed hopper. The control box operates by means of a microswitch to terminate operation of the auger and facilitate distribution of the feed accumulated in the drop tubes when the feed fills the last drop tube pursuant to operation of a timer. In a preferred embodiment of the invention, the entire brooder feeding apparatus is suspended in a centrally-located area in the poultry house and is capable of being raised and lowered by means of supporting cables to facilitate cleaning, adjustment of the height of the drop tubes over the feed pans and removal of the apparatus from the proximity of the brooder floor in the poultry house after approximately 2 to 3 weeks. After feeding the baby chicks for the 2 to 3 week term by operation of one or more brooder feeding apparatus, larger, conventional feeders located outside the brooding area are then used to feed the chicks to a market age of about 6½ weeks.

Poultry such as broilers are typically grown in a poultry house structure measuring approximately 38'×350' long. The poultry house is commonly divided transversely in half by a curtain which extends from the ceiling to the floor, thus making it possible to selectively heat and cool one-half of the structure at a time. This heated area of the poultry house is the area where poultry such as small chickens ("chicks") are kept from birth to approximately 2 to 3 weeks of age, depending upon the outside temperature and prevailing weather. This area is called the brooder area of the chicken house and the chicks must reach several days of age before they will venture out from the brooder area to eat. Accordingly, feeder trays having a diameter of approximately 24 inches and one inch in height are typically placed close to heated brooders in the brooder area, in order to insure that the hatched chicks eat, drink and stay warm until they are about seven days old. At this time, the chicks will begin to venture out of the brooder area and attempt to eat from the larger outside feeder pans. However, these outside feeder pans are typically three inches high and are designed for larger birds, so that many of the chicks starve from lack of feed, if no other source of food is provided during the first few days. Accordingly, the small brooder chicks are usually fed in the brooder feed pans by hand at least twice daily during the first critical seven-day period of time. Each chick eats approximately six-tenths of a pound of feed by the time it is two weeks of age; accordingly, approximately five thousand pounds of feed must be dispensed by hand in the brooder area of a conventional poultry house over a two-week period of time. The chicks will also consume about 3700 pounds of feed from existing larger conventional mechanical feeders by the time they reach two weeks of age, which mechanical feeders are primarily designed to feed only the larger chickens after 2 to 3 weeks of age. The brooder feeding apparatus of this invention delivers feed to the young chicks automatically, at least twice daily, in 5 to 12 minutes of total feed-distribution time, saving extensive hand labor. Most poultry farmers own two to four poultry houses, each with a capacity of about 14,000 chickens. Accordingly, about 10,000–20,000 pounds of feed must be placed in the brooder feed pans by hand during the entire brooding period, while feeding of the larger chickens is accomplished by automatic mechanical feeders.

DESCRIPTION OF THE PRIOR ART

Typical automatic feeding devices used in poultry houses consist of a feed hopper and power unit combination which delivers feed by operation of a ribbon or "flex" auger positioned inside a tube or a rounded trough. This auger and tube or trough combination extends from inside a feed hopper located at one end of the poultry house to the other end of the structure. The feeder delivers feed to pans of about 3 inches in height which are connected to the primary delivery tube at spaced intervals, in order to receive the feed. The number of pans utilized in the feeding system varies according to the number of chickens to be fed. A small opening at the point of attachment of each pan to the tube or trough allows feed to fall sequentially into the pans, with the filling of the pans proceeding sequentially according to the distance between the respective pans and the feed hopper. The feed is automatically supplied to the hopper by an overhead auger and the existing conventional mechanical feeders are designed to accomodate larger poultry and are located outside the brooding area of the poultry house. In each feeder, the end pan is provided with an enclosure which is fitted with a control tube having a microswitch. The microswitch is designed to interrupt the flow of electric current and stop the auger when feed which is delivered through the entire length of the tube or trough, drops into the control tube and fills the last pan located beneath the control tube.

A critical problem in the feeding of baby chicks and particularly, those chicks which are brooded in large poultry houses, is that of supplying feed and water to the chicks during a time period immediately after the chicks are hatched, until about seven days from hatching time. Since the chicks will not initially venture from the brooder area by nature, they must be fed by hand from small trays or feed troughs in the brooding area which have a very short lip or edge to facilitate easy access to the feed. As above noted, the time and logistics required in the dispensing of a considerable quantity of feed by hand in a short period of time frequently results in inadequate feeding of the chicks and many small chicks die as a result of unintentional neglect. Furthermore, conventional auger-operated mechanical feeders set up to feed larger poultry are not designed to feed these small chicks.

Pertinent prior art is disclosed in applicant's Information Disclosure Statement which was filed with his co-pending application, Ser. No. 06/861,141, filed May 8, 1986, entitled "Brooder Feeding Apparatus". In addition to this art, other pertinent art of which applicant is aware, includes U.S. Pat. No. 3,415,228, dated Dec. 10, 1968, to L. A. Myers, entitled "Feed Control Apparatus". This patent details a control system for a mechanical poultry feeder, in which a feed-actuated panel switch is provided for stopping a conveyor motor when a predetermined amount of feed has been delivered. Electromagnetic means is provided in the system for holding the panel to prevent operation of the conveyor motor for a predetermined period of time. U.S. Pat. No. 4,337,728, dated July 6, 1982, to Carl Van Gilst, discloses a "Programmed Hog Feeder and Process". This patent details a method for feeding hogs which includes a first step to provide the hogs with all the feed which they care to consume for a limited feeding period and thereafter denying all feed to the hogs for a limited period of time in a second step. The apparatus for carrying out this feeding cycle includes a feed pan or trough, a high capacity feed delivery conveyor and a timed feed shut-off means interposed between the feed trough means and the feed delivery conveyor, for alternately delivering and preventing delivery of feed to the feed trough. An optional water nozzle can be located above the feed trough to deliver water to the hogs during the feeding period and a timed water shut-off means may be interposed between the water nozzle and the water delivery pipe, for alternately permitting and preventing delivery of water to the water nozzle.

It is an object of this invention to provide a new and improved brooder chick feeding apparatus which is located in the brooder area of a chicken or poultry house, which apparatus includes a feed distribution system of the auger-tube design which is suspended at various points along the length of the brooder area, in order to better facilitate distribution of feed to the chicks in the brooder area and valving of the drop tubes in the feed distribution system to facilitate precise control of feed rate.

Another object of this invention is to provide at least one new and improved brooder feeding apparatus for a poultry house, which brooder feeding apparatus is located in or near the longitudinal center area of the poultry house and is characterized by an elongated tube provided with an internal flex auger and a feed hopper at one end with an automatic cut-off switch at the opposite end, the tube further provided with openings spaced at valve-equipped drop tubes located in spaced relationship along the length thereof, for sequentially delivering feed to the drop tubes in controlled quantities and subsequently depositing the feed in a single operation in shallow feed pans located beneath the drop tubes and further including support cables attached to the feed distribution apparatus for raising and lowering the apparatus for cleaning and maintenance purposes.

Still another object of this invention is to provide a new and improved brooder feeding apparatus for poultry houses, which brooder feeding apparatus is designed specifically to locate in a central brooder area of a poultry house and is characterized by an elongated primary tube fitted with support cables and lifting means such as a winch for raising and lowering the primary tube to a selected height above ground level, the primary tube further provided with removable drop tubes fitted with air cylinder and cable-actuated valves located in spaced relationship thereon and valve-controlled openings provided in the tube corresponding to the drop tubes. A feed hopper is located at one end of the tube and a cut-off switch provided at the opposite end, the tube also fitted with a flex auger driven by a microswitch-controlled motor for sequentially moving feed from the feed hopper down the entire length of the tube for distribution to the drop tubes and subsequent delivery into shallow feed pans located beneath the drop tubes, to feed baby chicks in the brooder area only.

A still further object of this invention is to provide a new and improved brooder feeding apparatus and method for operating the brooder feeding apparatus, which apparatus includes an elongated pipe or tube fitted with a flex auger therein and a feed hopper at one end for receiving one end of the flex auger, with a control box located at the opposite end of the flex auger and a microswitch-controlled motor provided in close proximity to the control box for driving the flex auger. Further included are multiple valve-operated drop tubes extending from the tube in spaced relationship and holes provided in the tube at the drop tubes for sequentially accumulating feed in the drop tubes and subsequently dumping the feed into shallow feed pans located beneath the drop tubes.

Another object of this invention is to provide a method of feeding baby poultry in a poultry house which includes the steps of providing a brooder area in the center section of the poultry house, installing one or more brooder feeding apparatus in this center area and operating the brooder feeding apparatus to dispense feed through specially designed drop tubes into brooder pans for feeding baby poultry.

SUMMARY OF THE INVENTION

These and other objects of the invention are provided in a method and apparatus for feeding baby poultry in a poultry house, which apparatus includes a pair of brooder feeding devices for location in parallel relationship the central, longitudinal brooder area of the poultry house. Each of the brooder feeding devices is characterized by an elongated tube which may be suspended by cables from the frame or rafters of the poultry house, a winch connected to the cables for raising and lowering the tube and further including multiple cable and valve-operated drop tubes provided in spaced relationship along the length of the tube for selectively receiving feed from a hopper located on one end of the tube or trough, which feed is moved by operation of an auger sequentially to the drop tubes where it is accumulated and then directed into brooder pans. The tube is terminated at the opposite end by a control box fitted with a microswitch operated by an associated timing means for terminating rotation of the auger when a specified quantity of feed has been accumulated in the drop tubes. The feed is then distributed to the brooder pans by operation of the timer after a predetermined period of time has elapsed.

BRIEF DESCRIPTION OF THE DRAWING

The invention will be better understood by reference to the accompanying drawings, wherein.

DESCRIPTION OF THE PREFERRED EMBODIMENTS

Figures 1, 2, 3:
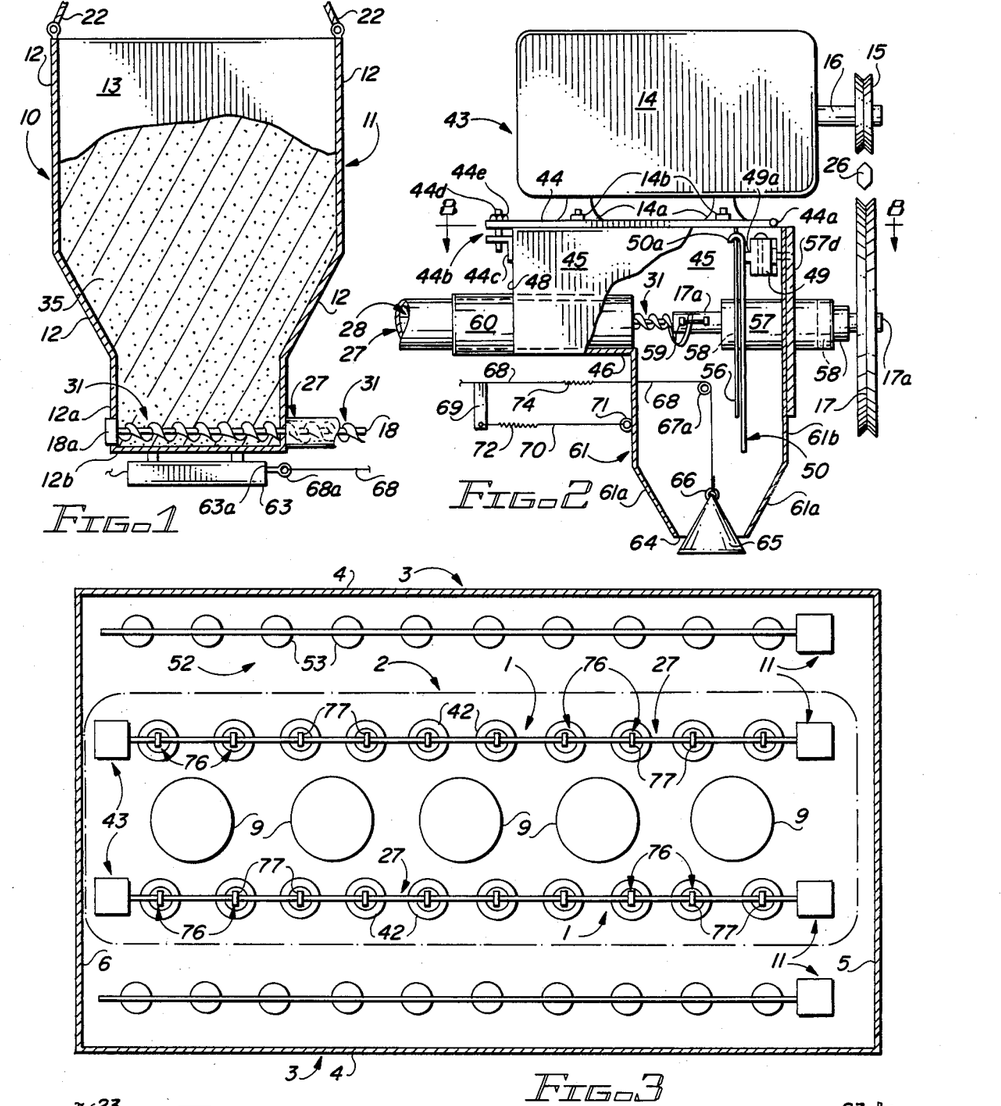
FIG. 1 is a sectional view of a preferred hopper trough element of the brooder feeding apparatus of this invention, with a feed tube attached thereto.
FIG. 2 is a perspective view, partially in section, of a preferred control box element located at the opposite end of the brooder feeding apparatus from the hopper trough element illustrated in FIG. 1.
FIG. 3 is a top elevation of a preferred poultry house layout illustrating a preferred centrally-located brooder area and a pair of brooder feeding apparatus located in the brooder area.
Figures 5, 6, 7:
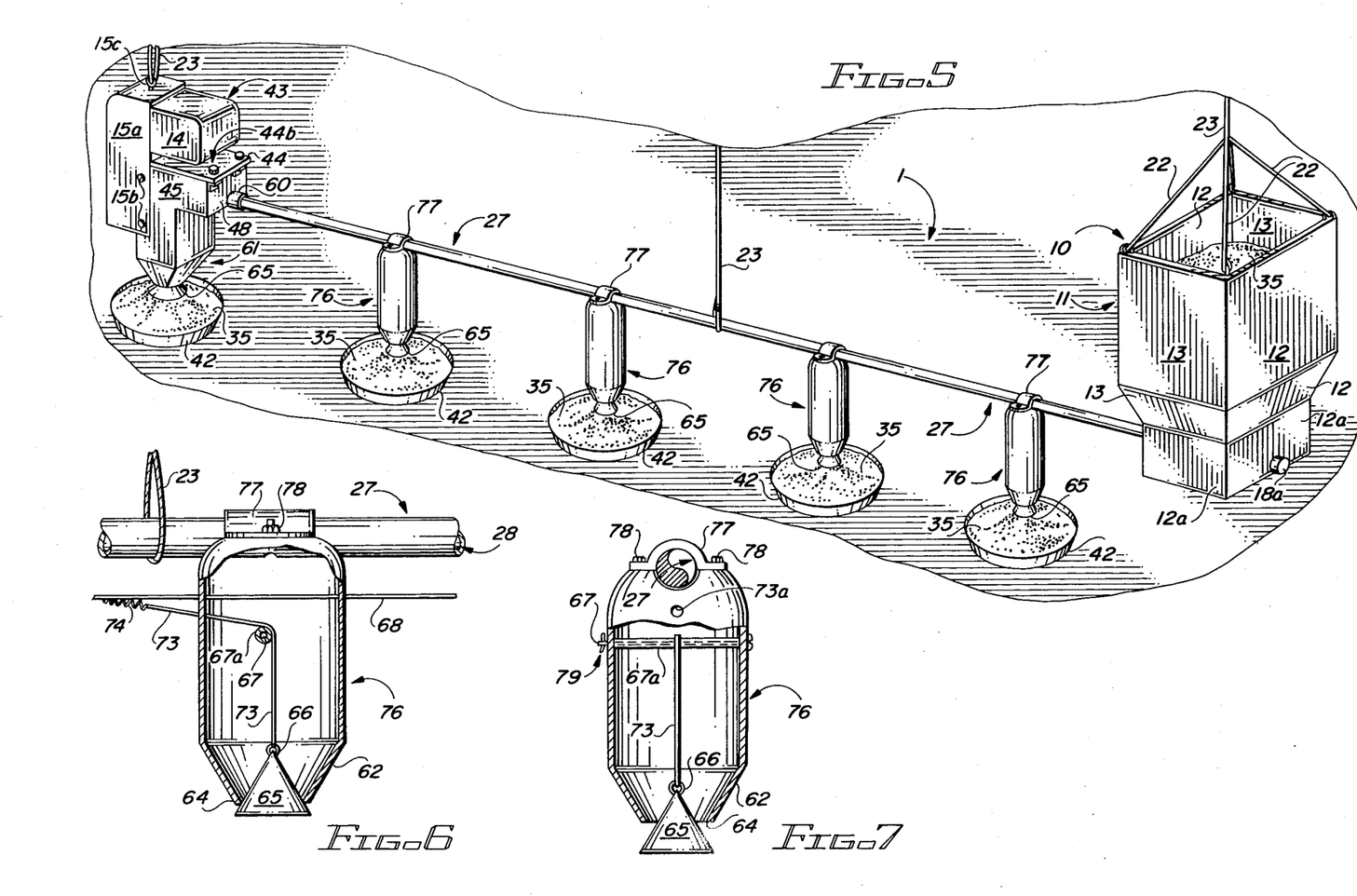
FIG. 5 is a perspective view of the preferred brooder feeding apparatus elements illustrated in FIG. 4, with the valve control cable removed, for clarity.
FIG. 6 is a side sectional view of a preferred line drop tube element of the brooder feeding apparatus illustrated in FIGS. 4 and 5.
FIG. 7 is an end sectional view of the line drop tube illustrated in FIG. 6.

Referring initially to FIGS. 1, 2 and 5 of the drawings and particularly to FIG. 5, the brooder feeding apparatus of this invention is generally illustrated by reference numeral 1. The brooder feeding apparatus 1 is further characterized by an elongated feed tube 27, provided with a hopper trough 11 at one end thereof and a control box 43 at the opposite end, as illustrated in FIG. 5. As detailed in FIGS. 1 and 5, the hopper trough 11 is further characterized by parallel trough ends 12 connected by parallel trough sides 13, which trough ends 12 and trough sides 13 taper to define a trough bottom 12a. The trough bottom 12a is closed by a bottom cap 12b, as illustrated in FIG. 1 and a solenoid valve-operated air cylinder 63 is attached to the bottom cap 12b, for purposes which will be hereinafter described. A harness 22 is attached to the four corners of the trough ends 12 and the trough sides 13, in order to raise the hopper trough 11 and the feed tube 27, as further hereinafter described. The feed tube 27 is attached to one of the trough sides 12 of the feed hopper 10 and one end of an auger 31, having an auger shaft 18, projects from the tube bore 28 of the feed tube 27 and through the trough end 12 to a hopper bearing 18a, located in the opposite trough bottom 12a, as illustrated in FIG. 1. Accordingly, it will be appreciated that the auger 31 is exposed to the feed 35 and is rotatably disposed within the hopper trough 11 and inside the feed tube 27, in order to cause the feed 35 to flow through the tube bore 28 of the feed tube 27 responsive to rotation of the auger 31, as hereinafter further described.

Figure 8:
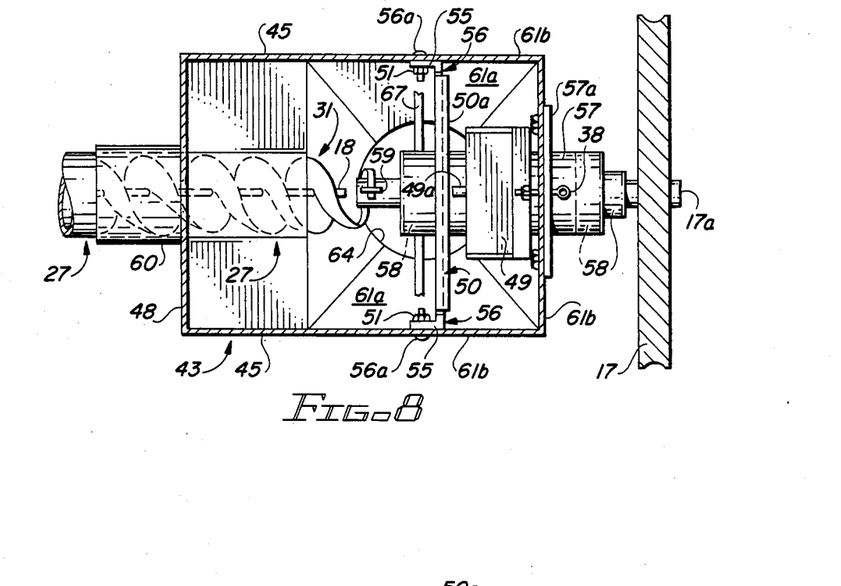
FIG. 8 is a top sectional view of the control box illustrated in FIG. 2.
Figure 9:
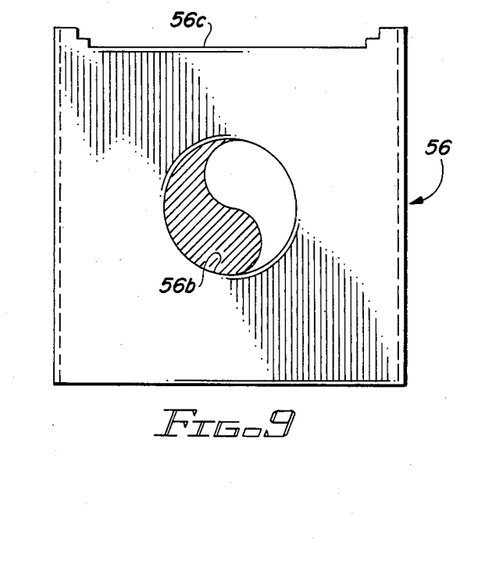
FIG. 9 is a front view of a mount plate located in the control box for receiving a swing plate disposed for sensing the quantity of feed delivered to the control box.
Figure 10:
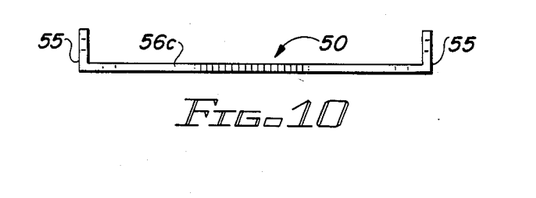
FIG. 10 is a top view of the mount plate illustrated in FIG. 9.
Figure 11:
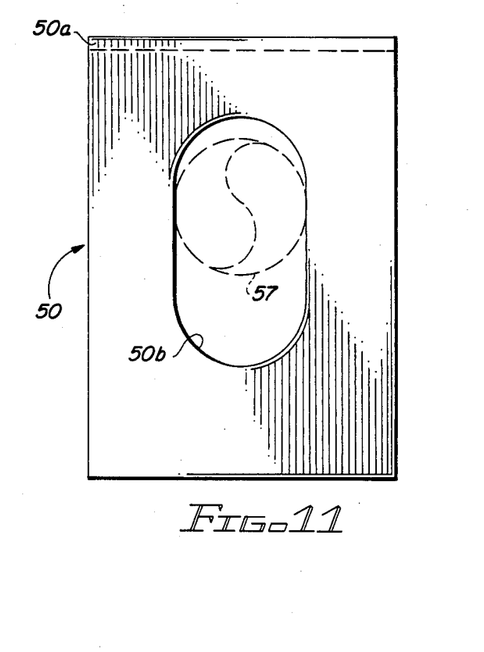
FIG. 11 is a front view of the swing plate pivotally carried by the mount plate illustrated in FIGS. 9 and 10.
Figure 12:
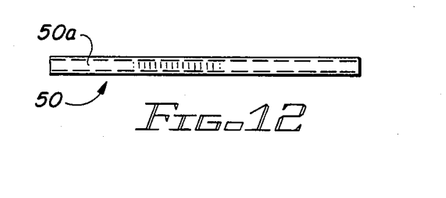
FIG. 12 is a top view of the swing plate illustrated in FIG. 11.

As further illustrated in FIGS. 2, 5 and 8–12 of the drawings, a portion of the feed 35 which is introduced into the tube bore 28 of the feed tube 27 traverses the entire length of the feed tube 27 and is ultimately delivered to the control box 43. Referring now to FIGS. 2, 5 and 8, this quantity of feed 35 is expelled from the tube bore 28 of the feed tube 27 downwardly into the control box feed chamber 61, having a chamber taper 61a, where it is first accumulated and then delivered to the end one of the brooder pans 42, as illustrated in FIG. 5. The control box 43 is further characterized by a box end 48, box sides 45, which span a hinged box top 44 and a box bottom 46, which closes the top of the control box 43 to the point where the control box feed chamber 61 extends downwardly from the control box 43, as illustrated in FIG. 2. The chamber sides 61b and chamber taper 61a define the bottom of the control box 43 and a length of bearing tubing 57 is welded or otherwise secured to a bearing tubing plate 57a, which is bolted or otherwise removably secured to the outside one of the chamber sides 61b in the control box 43, in order to dispose the greater portion of the bearing tubing 57 inside the control box feed chamber 61. A pair of bearings 58 are provided in each end of the bearing tubing 57, one of which bearings 58 supports the extending end of the pulley shaft 17a and the other of which supports the rear internal end of the pulley shaft 17a. The extending end of the feed tube 27 projects through an auger sleeve 60, mounted in the box end 48 of the control box 43 and the corresponding end of the auger 31 is attached to the internally-located end of the pulley shaft 17a by means of a shaft mount bracket 59, as illustrated in FIGS. 2 and 8. As further illustrated in FIGS. 9 and 11 of the drawings, the bearing tubing 57 projects through a tubing opening 56b located in the mount plate 56, which is attached to the chamber sides 61b of the control box 43, by means of plate mount bolts 56a and cooperating mount nuts 51, as illustrated in FIG. 8. The mount plate 56 extends downwardly through the control box feed chamber 61 in fixed relationship, parallel to the box end 48 of the control box 43. The bearing tubing 57 also projects through a generally elliptically-shaped swing plate slot 50b, located in a swing plate 50, which is pivotally carried by the mount plate 56 in swinging relationship, as further illustrated in FIG. 2. Referring to FIGS. 10 and 12 of the drawings, in a preferred embodiment the swing plate 50 is fitted with a curved swing plate tab 50a, which is adapted to engage the top edge 56c of the mount plate 56, in order to facilitate mounting of the swing plate 50 in swinging relationship on the mount plate 56 between the mount plate 56 and the chamber side 61b of the control box feed chamber 61 which receives the bearing tubing plate 57a, as illustrated in FIG. 2. A microswitch 49 is secured to the same chamber side 61b of the control box feed chamber 61 by means of a wing bolt 38 and is fitted with a sensing button 49a disposed in close proximity to the swing plate 50, in order to facilitate activation of the microswitch 49 when the swing plate 50 swings toward the microswitch 49 responsive to the pressure of feed 35 emptying from the auger sleeve 60 into the control box feed chamber 61, as hereinafter further described. A motor 14, having a projecting motor shaft 16, is bolted to the box top 44 as illustrated in FIG. 2. Furthermore, in a most preferred embodiment of the invention, the box top 44 is hinged to the end of the control box 43 by means of a hinge 44a and is further characterized by a pair of latches 44b, each of which includes a latch bracket 44c, secured to the opposite end 48 of the control box 43 and a latch bolt 44d secured by a latch nut 44e when fitted in a slot (not illustrated) provided in the box top 44, in order to maintain the box top 44 in closed configuration and the motor 14 in operational mode, as illustrated in FIG. 2. A motor pulley 15 is keyed to the projecting end of the motor shaft 16 of the motor 14 and is provided in alignment with a control box pulley 17 mounted on the pulley shaft 17a which projects through the bearings 58 of the bearing tubing 57. A belt 26, illustrated in section in FIG. 2, connects the motor pulley 15 and the control box pulley 17, in order to facilitate rotational operation of the auger 31 in the tube bore 28 of the feed tube 27, as hereinafter further described. Accordingly, referring again to FIG. 5 of the drawings, it will be appreciated that when the auger 31 is rotating inside the feed tube 27 responsive to operation of the motor 14, some of the feed 35 located in the hopper trough 11 of the feed hopper 10 is caused to traverse the length of the feed tube 27 and ultimately spill from the extending end of the feed tube 27 into the control box feed chamber 61, as illustrated in FIG. 2.

Referring now to FIGS. 2 and 5-7 of the drawings, a portion of the feed 35 which moves through the tube bore 28 of the feed tube 27 by operation of the auger 31 is also distributed to and accumulated in the various line drop tubes 76, which are disposed in spaced relationship on the feed tube 27, as illustrated in FIG. 5. These line drop tubes 76 are each attached to the feed tube 27 by means of a drop tube cap 77, which is bolted to the companion line drop tube 76 by means of cap bolts 78, as illustrated in FIGS. 6 and 7. An opening (not illustrated) provided in the feed tube 27 at each of the line drop tubes 76 allows a quantity of feed 35 to flow from the tube bore 28 into each of the line drop tubes 76. Each of the line drop tubes 76 is generally tubular-shaped, with a downwardly-extending, circular, tapered throat 62 provided at the bottom thereof and a round tube opening 64 defined by the extending end of the tapered throat 62, as further illustrated in FIGS. 6 and 7. A cable pin 67 projects through a diameter of each of the line drop tubes 76 and is removably secured in the line drop tube 76 by means of a cotter pin 79, which projects through a hole in the extending end of the cable pin 67. A cable pin sleeve 67a may be rotatably positioned on the cable pin 67. One end of a valve control cable 68 is secured to the control cable eye 68a extending from the air cylinder 63, which is mounted to the bottom cap 12b of the hopper trough 11 and the opposite end of the valve control cable 68 extends through an opening in the control box feed chamber 61, as illustrated in FIGS. 1 and 2. This latter end of the valve control cable 68 projects around a cable pin sleeve 67a, rotatably mounted on the cable pin 67 and is secured to a valve eye 66, which supports a cone-shaped feed control valve 65, positioned in the round tube opening 64 of the control box feed chamber 61. A spring 74 is provided in the valve control cable 68 and a mount arm 69 extends downwardly from fixed attachment to the valve control cable 68, as further illustrated in FIG. 2. A short mount cable 70 is stretched between the mount arm 69 and a mount cable eye 71, which is secured to the control box feed chamber 61 and a mount cable spring 72 is provided in the mount cable 70, in order to facilitate controlled opening of the tube opening 64 by operation of the cone-shaped feed control valve 65 when spring tension is applied to the valve control cable 68, as hereinafter further described. Referring again to FIGS. 6 and 7 of the drawings, the valve control cable 68 extends beneath the feed tube 27 along the entire length thereof and individual valve cables 73 project from fixed attachment to the valve control cable 68 through openings (not illustrated) in the walls of the respective line drop tubes 76 and around the respective cable pin sleeves 67a of the cable pins 67, to companion cone-shaped feed control valves 65, which are disposed in the round tube openings 64, respectively. A valve cable spring 74 is provided in each of the valve cables 73 near the point of attachment of each valve cable 73 with the cooperating valve control cable 68, in order to facilitate smooth opening of the tube openings 64 by applying tension to the valve control cable 68 and adjusting the position of each feed control valve 65 in the companion tube openings 64, respectively, as hereinafter further described.

Referring again to FIGS. 1, 2, 5 and 6 of the drawings, in operation, the air cylinder 63 illustrated in FIG. 1 is energized by a solenoid valve (not illustrated) and can be either manually operated or operated by means of a timer to initially apply tension to the valve control cable 68 in closed configuration and facilitate retraction of the cone-shaped feed control valves 65 into the respective tube openings 64 in the line drop tubes 76 and the control box feed chamber 61. At the same time, the motor 14 is energized by appropriate wiring (not illustrated), to effect rotation of the auger 31 in the tube bore 28 of the feed tube 27, and cause the feed 35 to be transferred from the hopper trough 11 through the feed tube 27 and into the respective line drop tubes 76 and finally, into the control box feed chamber 61. The feed 35 then spills through the respective tube openings 64 to fill the respective line drop tubes 76 and the control box feed chamber 61. When the feed accumulates inside the control box feed chamber 61, this accumulation causes the swing plate 50 to swing rearwardly in the direction of the arrow, as illustrated in FIG. 2 and touch the sensing button 49a in the microswitch 49. The microswitch 49 is electrically connected to the motor 14 and causes the motor 14 to stop operating. The timer continues to operate for a selected period of time which is greater than the time necessary to fill the line drop tubes 76 and control box feed chamber 61. The timer then deenergizes the air cylinder 63 by appropriate wiring (not illustrated) to allow the valve cable springs 74 and the mount cable spring 72 to tension the valve control cable 68, thereby applying tension to the respective valve cables 73 and extending the respective feed control valves 65 from the tube openings 64 of the line drop tubes 76 and the control box feed chamber 61, respectively, and opening the respective tube openings 64. This action prevents allows the feed 35 to flow through the tube openings 64 into the brooder pans 42.

Figure 4:
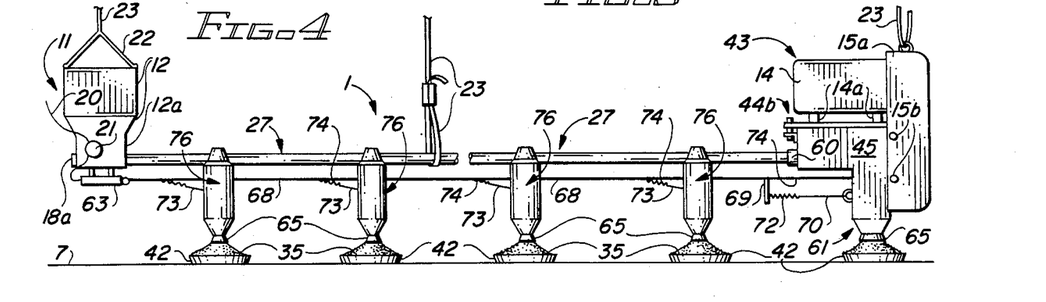
FIG. 4 is a side view, partially in section, of typical hopper trough, feed tube, drop tube, control box and auger elements of the brooder feeding apparatus of this invention.

Referring now to FIGS. 3 and 4 of the drawings, in a most preferred embodiment of the invention the brooder feeding apparatus 1 of this invention is set up along with a companion brooder feeding apparatus 1 in the centrally-located brooder area 2 of a poultry house 3, as illustrated in FIG. 4. The poultry house 3 is characterized by sides 4, a front 5, a rear 6 and the ground level 7 is illustrated in FIG. 4. Furthermore, multiple brooders 9 are provided between the brooder feeding apparatus 1 for hatching baby poultry, such as baby chicks. Each of the brooder feeding apparatus 1 is characterized by a feed hopper 10, having a hopper trough 11 located at one end thereof and a control box 43 at the other end, which hopper trough 11 and control box 43 are connected by a feed tube 27, as illustrated in FIG. 3. As further illustrated in FIG. 4, in a most preferred embodiment of the invention, a pulley cover 15a is removably disposed over the motor pulley 15 by means of cover bolts 15b and the control box 17 illustrated in FIG. 2, in order to minimize danger from the rotating belt 26. Furthermore, support cables 23 are extended around the feed tube 27 in spaced relationship and one of the support cables 23 is secured to the pulley cover 15a by means of the cover eye bolts 15c, while a companion harness 22 and support cable 23 is attached to the hopper trough 11 of the feed hopper 10, in order to effect lifting of the entire brooder feeding apparatus 1 to a selected distance above the ground level 7. This facility is necessary in order to periodically clean the poultry house 3 and to remove the brooder feeding apparatus 1 from the brooder area 2 when the chicks are sufficiently large to feed from feeding systems located elsewhere in the poultry house 3.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A brooder feeding apparatus for providing feed to brooder poultry in the brooder area of a poultry house, comprising:
   (a) an elongated feed conveying member with openings provided in the bottom of said feed conveying member in spaced relationship;
   (b) an auger disposed for rotation in said feed conveying member and a motor connected to one end of said auger at one end of said feed conveying member for rotating said auger inside said feed conveying member;
   (c) a feed hopper located at the opposite end of said feed conveying member, said feed hopper adapted to receive the opposite end of said auger for moving feed from said feed hopper through said feed conveying member responsive to operation of said motor; and
   (d) a plurality of drop tubes extending downwardly from said feed conveying member at said openings, respectively, for distributing feed from said feed hopper and said feed conveying member through said openings into said drop tubes responsive to rotation of said auger and valve means provided in said drop tubes, said valve means operable to selectively open and close said drop tubes and control the flow of feed from said drop tubes.

2. The brooder feeding apparatus of claim 1 further comprising suspension means extending from said poultry house to said feed conveying member in spaced relationship for supporting said feed conveying member and said drop tubes at a selected elevation above ground level in the poultry house.

3. The brooder feeding apparatus of claim 1 further comprising switch means provided in electrical contact with said motor for stopping said motor after a predetermined quantity of feed is distributed to said drop tubes.

4. The brooder feeding apparatus of claim 3 further comprising suspension means extending from said poultry house to said feed conveying member in spaced relationship for supporting said feed conveying member and said drop tubes at a selected elevation above ground level in the poultry house.

5. The brooder feeding apparatus of claim 3 wherein said switch means further comprises a control box adapted to receive said one end of said feed conveying member, a microswitch mounted inside said control box and a swing plate carried by said control box in swinging relationship adjacent said microswitch, whereby said microswitch is activated to stop said motor when the feed accumulates against said swing plate and causes said swing plate to contact said microswitch.

6. The brooder feeding apparatus of claim 2 wherein said suspension means further comprises lift cables attached to said feed conveying member and the poultry house and winch means provided in cooperation with said lift cables for adjusting the elevation of said feed conveying member and said drop tubes.

7. The brooder feeding apparatus of claim 3 wherein said switch means further comprises a control box adapted to receive said one end of said feed conveying member, a microswitch mounted inside said control box and a swing plate carried by said control box in swinging relationship adjacent said microswitch, whereby said microswitch is activated to stop said motor when the feed accumulates against said swing plate and causes said swing plate to contact said microswitch and further comprising timing means provided in cooperation with said motor and said switch means for selectively determining the time of operation of said motor and rotation of said auger.

8. The brooder feeding apparatus of claim 7 further comprising lift cables extending from said poultry house to said feed conveying member in spaced relationship for supporting said feed conveying member and said drop tubes at a selected elevation above ground level in the poultry house.

9. The brooder feeding apparatus of claim 3 further comprising timing means provided in cooperation with said motor and said switch means for selectively determining the time of operation of said motor and rotation of said auger.

10. The brooder feeding apparatus of claim 9 further comprising a plurality of shallow brooder feed pans disposed beneath said drop tubes, respectively, for containing the feed dispensed from said drop tubes.

11. The brooder feeding apparatus of claim 1 wherein said valve means further comprises a generally cone-shaped valve oriented in the mouth of each of said drop tubes; control cable means suspending said valve in said mouth; and tensioning means carried by said feed hopper and attached to said control cable means for selectively applying and releasing tension on said valve to open and close said mouth responsive to operation of said tensioning means.

12. The brooder feeding apparatus of claim 11 further comprising switch means provided in electrical contact with said motor for stopping said motor after a predetermined quantity of feed is distributed to said drop tubes.

13. The brooder feeding apparatus of claim 12 wherein said tensioning means further comprises an air-actuated cylinder and said switch means further comprises a control box adapted to receive said one end of said feed conveying member, a microswitch mounted inside said control box and a swing plate carried by said control box in swinging relationship adjacent said microswitch, whereby said microswitch is activated to stop said motor when the feed accumulates against said swing plate and causes said swing plate to contact said microswitch.

14. The brooder feeding apparatus of claim 13 further comprising timing means provided in cooperation with said air-actuated cylinder and said switch means for selectively determining the time and sequence of operation of said air-actuated cylinder and said motor and rotation of said auger.

15. The brooder feeding apparatus of claim 14 further comprising lift cables attached to said feed conveying member and the poultry house and winch means provided in cooperation with said lift cables for adjusting the elevation of said feed conveying member and said drop tubes.

16. The brooder feeding apparatus of claim 15 further comprising a plurality of shallow brooder feed pans disposed beneath said drop tubes, respectively, for containing the feed dispensed from said drop tubes.

17. A brooder feeding apparatus for installation in the brooder area of a poultry house comprising:
(a) an elongated feed conveying tube extending through the brooder area of the poultry house, an auger rotatably disposed in said feed conveying tube and a plurality of openings provided in the bottom of said feed conveying tube in spaced relationship;
(b) a feed hopper located at one end of said feed conveying tube, said feed hopper adapted to receive and support one end of said feed conveying tube, and said auger provided in contact with feed located in said feed hopper and a motor located at the opposite end of said feed conveying tube from said feed hopper, said motor connected to said auger for rotating said auger inside said feed conveying tube and transferring feed from said feed hopper to said plurality of openings provided in the bottom of said feed conveying tube;
(c) a plurality of drop tubes extending downwardly from said feed conveying tube in spaced relationship, said drop tubes communicating with said openings in said feed conveying tube and valve means provided in said drop tubes for controlling the flow of feed through said drop tubes, respectively;
(d) tensioning means carried by said feed hopper, said tensioning means connected to said valve means for selectively manipulating said valve means and opening and closing said drop tubes; and
(e) switch means located at said opposite end of said feed conveying tube, said switch means provided in electrical contact with said motor, whereby feed is caused to flow from said feed hopper through said feed conveying tube, said openings and into said drop tubes responsive to operation of said auger.

18. The brooder feeding apparatus of claim 17 further comprising a control box adapted to receive and mount said opposite end of said feed conveying tube and wherein said switch means further comprises a microswitch mounted inside said control box and further comprising a swing plate carried by said control box in swinging relationship adjacent said microswitch, whereby said microswitch is activated to stop said motor when the feed accumulates against said swing plate and causes said swing plate to contact said microswitch.

19. The brooder feeding apparatus of claim 18 wherein said tensioning means further comprises an air-actuated cylinder and a spring-loaded cable communicating with said valve means and said air-actuated cylinder.

20. The brooder feeding apparatus of claim 19 further comprising timing means provided in electrical connection with said air-actuated cylinder and said switch means for selectively determining the time and sequence of operation of said air-actuated cylinder and said motor and rotation of said auger.

21. A method of feeding baby poultry in a poultry house which includes the steps of selecting a brooder area in the poultry house; installing at least one brooder feeding apparatus in said brooder area; and operating said brooder feeding apparatus in said brooder area to dispense feed to the baby poultry.

22. The method of claim 21 wherein said at least one brooder feeding apparatus further comprises two brooder feeding apparatus disposed in side-by-side, substantially parallel relationship in said brooder area of the poultry house.

23. The method of claim 21 wherein said at least one brooder feeding apparatus further comprises:
(a) an elongated feed conveying member with openings provided in the bottom of said feed conveying member in spaced relationship;
(b) an auger disposed for rotation in said feed conveying member and a motor connected to one end of said auger at one end of said feed conveying member for rotating said auger inside said feed conveying member;
(c) a feed hopper located at the opposite end of said feed conveying member, said feed hopper adapted to receive the opposite end of said auger for moving feed from said feed hopper through said feed conveying member responsive to operation of said motor; and
(d) a plurality of drop tubes extending downwardly from said feed conveying member at said openings, respectively, for distributing feed from said feed hopper and said feed conveying member through said openings into said drop tubes responsive to rotation of said auger and valve means provided in said drop tubes, said valve means operable to selectively open and close said drop tubes and control the flow of feed from said drop tubes.

24. The method of claim 23 wherein said at least one brooder feeding apparatus further comprises two brooder feeding apparatus disposed in side-by-side, substantially parallel relationship in said brooder area of the poultry house.

25. The method of claim 21 further comprising the step of designating the longitudinal center area of the poultry house as said brooder area.

26. The method of claim 25 wherein said at least one brooder feeding apparatus further comprises two brooder feeding apparatus disposed in side-by-side, substantially parallel relationship in said longitudinal center area of the poultry house.

27. The method of claim 26 wherein each of said brooder feeding apparatus further comprises:
(a) an elongated feed conveying member with openings provided in the bottom of said feed conveying member in spaced relationship;
(b) an auger disposed for rotation in said feed conveying member and a motor connected to one end of said auger at one end of said feed conveying member for rotating said auger inside said feed conveying member;

(c) a feed hopper located at the opposite end of said feed conveying member, said feed hopper adapted to receive the opposite end of said auger for moving feed from said feed hopper through said feed conveying member responsive to operation of said motor; and (d) a plurality of drop tubes extending downwardly from said feed conveying member at said openings, respectively, for distributing feed from said feed hopper and said feed conveying member through said openings into said drop tubes responsive to rotation of said auger and valve means provided in said drop tubes, said valve means operable to selectively open and close said drop tubes and control the flow of feed from said drop tubes.

28. The method of claim 21 further comprising the step of placing a plurality of brooder feed pans beneath said brooder feeding apparatus for receiving the feed and suspending said brooder feeding apparatus above said brooder feed pans.

29. The method of claim 28 wherein said at least one brooder feeding apparatus further comprises two brooder feeding apparatus disposed in side-by-side, substantially parallel relationship in said brooder area of the poultry house.

30. The method of claim 29 wherein each of said brooder feeding apparatus further comprises:

(a) an elongated feed conveying member with openings provided in the bottom of said feed conveying member in spaced relationship;

(b) an auger disposed for rotation in said feed conveying member and a motor connected to one end of said auger at one end of said feed conveying member for rotating said auger inside said feed conveying member;

(c) a feed hopper located at the opposite end of said feed conveying member, said feed hopper adapted to receive the opposite end of said auger for moving feed from said feed hopper through said feed conveying member responsive to operation of said motor; and (d) a plurality of drop tubes extending downwardly from said feed conveying member at said openings, respectively, for distributing feed from said feed hopper and said feed conveying member through said openings into said drop tubes responsive to rotation of said auger and valve means provided in said drop tubes, said valve means operable to selectively open and close said drop tubes and control the flow of feed from said drop tubes.

31. The method of claim 30 further comprising the step of designating the longitudinal center area of the poultry house as said brooder area.

* * * * *

UNITED STATES PATENT AND TRADEMARK OFFICE
CERTIFICATE OF CORRECTION

PATENT NO.   : 4,815,417

DATED        : Mar. 28, 1989

INVENTOR(S)  : George W. Strong

It is certified that error appears in the above-identified patent and that said Letters Patent is hereby corrected as shown below:

Column 8, line 55, after "action", the word "prevents" should be deleted.

Column 8, line 66, after "for", the word "hatching" should be changed to "warning".

Signed and Sealed this

Twenty-fifth Day of December, 1990

Attest:

HARRY F. MANBECK, JR.

*Attesting Officer*      *Commissioner of Patents and Trademarks*